(12) United States Patent
Wiemann et al.

(10) Patent No.: US 11,951,822 B2
(45) Date of Patent: Apr. 9, 2024

(54) BATTERY CARRIER AND VEHICLE HAVING SAID BATTERY CARRIER

(71) Applicant: voestalpine Metal Forming GmbH, Krems an der Donau (AT)

(72) Inventors: Marcus Wiemann, Melle (DE); Michael Haslmayr, Gutau (AT); Matthias Stumvoll, Weißenkirchen in der Wachau (AT); Claudio Canalini, Geislingen (DE)

(73) Assignee: voestalpine Metal Forming GmbH, Krems an der Donau (AT)

( * ) Notice: Subject to any disclaimer, the term of this patent is extended or adjusted under 35 U.S.C. 154(b) by 559 days.

(21) Appl. No.: 17/261,820

(22) PCT Filed: Jul. 22, 2019

(86) PCT No.: PCT/EP2019/069725
§ 371 (c)(1),
(2) Date: Jan. 20, 2021

(87) PCT Pub. No.: WO2020/016460
PCT Pub. Date: Jan. 23, 2020

(65) Prior Publication Data
US 2021/0339616 A1    Nov. 4, 2021

(30) Foreign Application Priority Data
Jul. 20, 2018   (EP) ..................... 18184836

(51) Int. Cl.
*B60K 1/04*       (2019.01)
*B60L 50/64*      (2019.01)
(Continued)

(52) U.S. Cl.
CPC ................ *B60K 1/04* (2013.01); *B60L 50/64* (2019.02); *H01M 10/625* (2015.04);
(Continued)

(58) Field of Classification Search
CPC ... B60K 1/04; B60K 2001/0438; B60L 50/64; H01M 10/6556; H01M 10/625; H01M 10/6568; H01M 50/262; H01M 2220/20
See application file for complete search history.

(56) References Cited

U.S. PATENT DOCUMENTS

| | | | |
|---|---|---|---|
| 2002/0102454 A1* | 8/2002 | Zhou | H01M 50/209 429/88 |
| 2012/0103714 A1* | 5/2012 | Choi | B60K 1/04 180/68.5 |
| 2019/0036092 A1* | 1/2019 | Günther | H01M 50/242 |

FOREIGN PATENT DOCUMENTS

| | | |
|---|---|---|
| DE | 102015221617 A1 | 5/2017 |
| DE | 102016205124 B3 | 7/2017 |

(Continued)

*Primary Examiner* — Jason D Shanske
*Assistant Examiner* — James J Triggs

(57) ABSTRACT

A battery carrier having a trough formed from shaped sheet metal, which has at least one trough side wall and a trough bottom connected to the trough side wall, a plurality of support profiles provided in the trough and affixed to the trough, at least one battery pack, which is affixed to at least two support profiles extending adjacent to the battery pack, a lid, which is detachably connected to said trough, and a heat exchanger, which is thermally connected to the battery pack and has at least one flow channel for a liquid. In order to enable a simple design and simple assembly and maintenance, it is proposed for the lid to form the heat exchanger, wherein the battery pack is arranged at a distance from the trough bottom and the trough bottom is permanently connected to the trough side wall or embodied of one piece with it.

19 Claims, 2 Drawing Sheets

(51) Int. Cl.
H01M 10/625 (2014.01)
H01M 10/6556 (2014.01)
H01M 10/6568 (2014.01)
H01M 50/204 (2021.01)
H01M 50/224 (2021.01)
H01M 50/262 (2021.01)
H01M 50/271 (2021.01)
H01M 50/296 (2021.01)

(52) U.S. Cl.
CPC ... *H01M 10/6556* (2015.04); *H01M 10/6568* (2015.04); *H01M 50/204* (2021.01); *H01M 50/224* (2021.01); *H01M 50/262* (2021.01); *H01M 50/271* (2021.01); *B60K 2001/0438* (2013.01); *H01M 50/296* (2021.01); *H01M 2220/20* (2013.01)

(56) References Cited

FOREIGN PATENT DOCUMENTS

DE 102016115647 B3 12/2017
DE 102016121247 A1 5/2018
DE 102016125693 A1 6/2018

* cited by examiner

BATTERY CARRIER AND VEHICLE HAVING SAID BATTERY CARRIER

FIELD OF THE INVENTION

The invention relates to a battery carrier, having a trough formed from shaped sheet metal, which has at least one trough side wall and a trough bottom connected to the trough side wall, having a plurality of support profiles provided in the trough and affixed to the trough, having at least one battery pack, which is affixed—in particular detachably—to at least two support profiles extending adjacent to the battery pack, in particular parallel to each other, having a lid, which is designed to be able to close the trough and is detachably connected to said trough, and having a heat exchanger, which is thermally connected to the battery pack and has at least one flow channel for a liquid.

DESCRIPTION OF THE PRIOR ART

Battery carriers for housing and protecting a battery or the electrically interconnected battery packs thereof are known from the prior art (DE10201611564763). Such battery carriers are essentially composed of a trough and lid that is designed so that it is able to close the trough and is detachably connected to it. The battery packs provided in the trough are arranged in suspended fashion above the lid at a distance from it in order to protect these battery packs from plastic deformations of the lid, for example due to the impact of a rock on the underside of a motor vehicle. The battery packs are affixed to support profiles, which—connected to a self-supporting frame structure—form the trough side wall of the trough. For the trough bottom, a sheet is provided, which is firmly connected to the frame structure and is also thermally connected to the battery packs in order to control the temperature of these battery packs, i.e. to cool or heat them. For this purpose, a heat transfer medium flows through the trough bottom, which is why this trough bottom is embodied with a plurality of flow channels.

Battery carriers of this kind are comparatively expensive to produce and also, due to the suspended arrangement of the battery packs in a trough on the underside of the vehicle, whose opening is oriented toward the top, are comparatively difficult to maintain. This is particularly true in the vicinity of the heat exchanger, which is firmly connected to the frame structure and is thermally connected to the battery packs.

SUMMARY OF THE INVENTION

The object of the invention, therefore, is to modify the design of a battery carrier of the type described at the beginning such that it is easy and inexpensive to both produce and maintain. In addition, the battery carrier should be able to withstand powerful mechanical loads.

If the lid forms the heat exchanger, then among other things, this can offer the possibility of inspecting the battery pack with relative ease—in particular, even in the vicinity of the thermal transmission to the heat exchanger. In addition, the maintenance can be performed even when the battery pack is mounted in the trough since the battery pack is arranged at a distance from the trough bottom and is thus accessible in the region of the heat exchanging surfaces via the removed lid that has been detached from the trough.

In addition, the assembly of the battery carrier according to the invention with a battery pack, which has been inserted through its trough opening and is arranged at a distance from the trough bottom, is much simpler than is enabled by the prior art.

In addition, the battery carrier according to the invention is easier to maintain since when it has been detached from the vehicle, it is only necessary to detach the lid from the trough so that for example the battery pack is accessible for inspection, replacement, etc.

The above-mentioned advantages reduce the costs of producing and maintaining the battery carrier.

By means of the above-mentioned advantages, primarily because of the simplified assembly and accessibility of the battery pack, it is possible to permanently connect the trough bottom to the trough side wall or to embody it as being of one piece with the latter—making it possible to ensure a particularly high mechanical load capacity of the battery carrier according to the invention, for example in order to provide the battery pack with particularly good protection. In addition, this permits the design of the battery carrier to be significantly simplified. The above-mentioned one-piece embodiment also contributes to the tight sealing of the battery carrier since it renders welding seams or other connection types irrelevant.

If the trough is formed from a shaped, preferably deep-drawn, sheet metal, in particular sheet steel, the production of the trough can be even further simplified and its stability can be increased. It is also conceivable to embody the trough by means of a folded sheet metal, which is also known, for example, as a folding battery case.

If the battery pack is arranged suspended at a distance A from the trough bottom, this suspension can for example further simplify the assembly of the battery carrier. In addition, such a design simplification in the mounting of the battery pack can also simplify the maintenance of the battery pack. The suspension can, for example, be embodied by means of flanges on the battery pack.

If the support profiles are formed from shaped sheet metal, in particular sheet steel, then it is possible to further increase the torsional rigidity of the trough. Furthermore, even when powerful inertial forces are exerted on the battery packs, support profiles of this kind are able to ensure the precise positioning of its suspended arrangement—which contributes to the stability of the battery carrier.

If the support profiles are connected to an in particular self-supporting frame structure, which frame structure is affixed to the trough, in particular permanently connected to the trough, then this can further simplify the production of the battery carrier.

The fatigue strength of the battery carrier can be further increased if the frame structure is permanently connected to the trough side wall and/or to the trough bottom.

The mechanical load capacity of the battery carrier can be further increased if first support profiles are provided as cross-members in the trough. This is especially true if the cross-members are also permanently connected to the trough bottom.

For example, the electrical wiring of the battery pack can be simplified if second support profiles are provided as longitudinal members in the trough, which longitudinal members are arranged below the upper edges of the cross-members in the trough. For example, the resulting height difference simplifies the routing of an electrical connection. This can also offer the possibility of providing the poles of the battery pack transversely to the battery carrier—which can enable production of an electrical connection in a space-saving way.

Preferably, these cross-members are more than twice as high as the longitudinal members.

For example, the longitudinal members are affixed to the cross-members and preferably, are permanently connected to them.

Among other things, the crash behavior of the battery carrier can be improved if third support profiles are provided as lateral members in the trough and adjoining the trough side wall. In addition, these lateral members can simplify the installation of the other support profiles in the trough. Preferably, the lateral members are permanently connected to the trough side wall and/or to the trough bottom, which can contribute to increasing the strength of the battery carrier.

If cross-members, in particular all of them, extend continuously from one lateral member to the other opposing lateral member, then this can provide not only a reinforcement in the battery carrier, but also identical mounting conditions for other battery packs and can facilitate installation thereof.

If the frame structure is formed of cross-members, longitudinal members, and lateral members, it is possible to further simplify the production of the battery carrier since such a frame structure can be easily inserted into the trough and connected thereto. In this regard, permanent connections can yield advantages with regard to the fatigue strength of the battery carrier.

The design of the battery carrier can be further simplified if in cross-section, the support profiles are embodied as hat-shaped or in the form of closed, hollow profiles. In addition, a profile form of this kind is particularly easy to permanently connect, for example weld, to the trough bottom.

Simplified mounting conditions in the battery carrier can be achieved if the battery pack has laterally protruding flanges, which rest on the support profiles and by means of which the battery pack is affixed to the support profiles. For example in this case, the cross-members and lateral members can excel as support profiles. The flanges form the suspension of the battery pack in the trough. The battery pack can thus be affixed in the trough in suspended fashion at a distance from the trough bottom.

If the lid braces the suspended battery pack in the battery carrier, then in addition to securing the position of the battery pack in the trough, this can also ensure a low thermal resistance in the thermal connection between the battery pack and the lid serving as a heat exchanger. The temperature control of the battery pack can thus be carried out in a comparatively simple and effective manner—which in turn contributes to the long service life of the battery pack.

The bracing of the suspended battery pack by means of the lid can be provided in a simply designed way if the lid rests with a prestressing force against the battery pack, possibly by means of a thermal contact element, in particular by means of a heat-conducting foil or heat-conducting pad.

If the trough has a circumferential trough flange, which adjoins the trough side wall, and the lid is embodied as detachably connectable thereto, then it is possible to achieve an encapsulation of the battery pack by the battery carrier in a way that is simple and durable in relation to environmental influences. A particularly high stability of the battery pack can therefore be expected.

In a simply designed way, the lid can have at least two sheets that are connected to each other and form the flow channel between themselves. In addition, the flow channel between the sheets can also increase the torsional rigidity of the lid. An improved stability of the battery carrier can also be expected as a result.

Preferably, the battery carrier has a plurality of battery packs. The battery packs are electrically interconnected to form a battery. The battery packs are each affixed, in particular detachably, by means of a suspension to at least two support profiles extending adjacent to the respective battery pack, in particular parallel to each other, namely by means of a suspension. This suspension is embodied, for example, by means of flanges on the battery packs. This distributed arrangement of the battery cells of the battery in the trough allows an increased number of support profiles to be provided in the trough. The trough can therefore be reinforced, which can provide better protection for the battery packs.

In particular, the battery carrier according to the invention can excel in a vehicle, if the battery carrier is arranged underneath the body floor pan of the vehicle with its lid oriented toward the body floor pan.

In particular, the battery carrier according to the invention can be suitable for a traction battery for a vehicle, preferably a motor vehicle.

BRIEF DESCRIPTION OF THE DRAWINGS

The subject of the invention is shown in greater detail by way of example in the figures based on one embodiment variant. In the drawings.

WAY TO IMPLEMENT THE INVENTION

Figure 1:
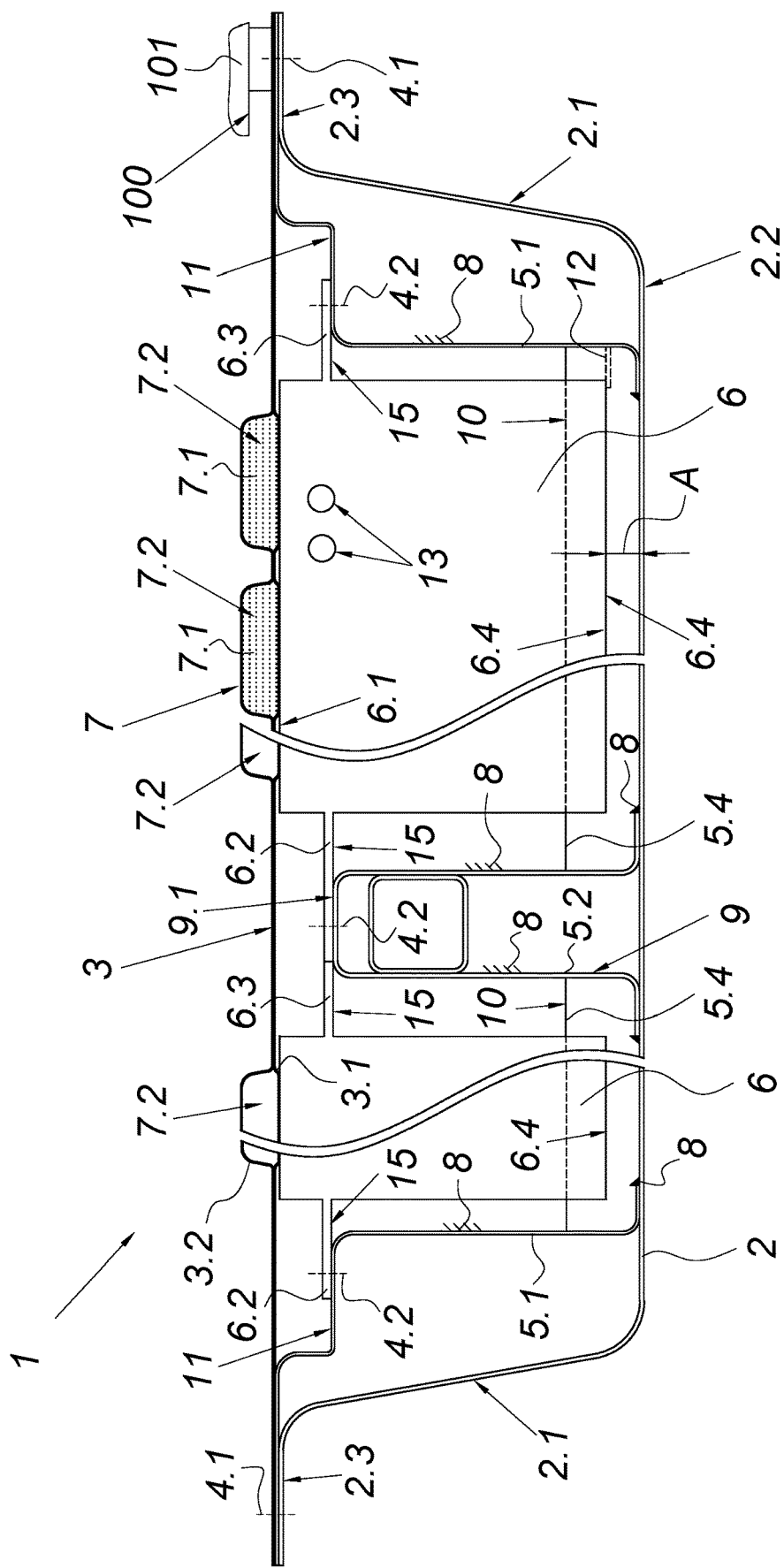
FIG. 1 shows a cut-away side view of a battery carrier.

FIG. 1 shows an example of a battery carrier 1 (often also called a battery case) having a trough 2 and having a lid 3 that closes the trough 2. This lid 3 is detachably connected to the trough 2 by means of first screw connections 4.1 that are depicted in an implied way. The trough 2 has a trough side wall 2.1 and a trough bottom 2.2 that is connected to the trough side wall 2.1. The battery carrier 1 is part of a traction battery, not shown in detail, for a vehicle, in particular a motor vehicle.

In the trough 2, there is a plurality of support profiles 5.1, 5.2, 5.3, 5.4 provided, which are affixed to the trough. In addition, the battery carrier 1 has a plurality of battery packs 6 adjacent to which the support profiles 5.1, 5.2, 5.3, 5.4 extend. These battery packs 6 are electrically interconnected to form a battery by means of electrical connections that are not shown in detail. The battery packs 6 preferably have lithium-ion cells. As is known, a battery pack 6 is understood to be a pack of a plurality of battery cells 6.7 that are interconnected by means of a cell connector or bus bar 6.8, which battery cells 6.7 are preferably enclosed by a housing 6.8 and this is often referred to as the battery module 6. The battery pack 6 has electrical poles 13 for producing electrical connections in order to connect this battery pack 6 to other battery packs 6 to form a battery, preferably a traction battery.

It is clear that a battery pack 6 is detachably fastened to support profiles 5.1, 5.2 or 5.2, 5.2 at two respective ends, which are parallel to each other and are on different sides—at opposite ends in the exemplary embodiment. For this purpose, a suspension 15 is provided between the support profiles 5.1, 5.2 or 5.2, 5.2 and the battery pack 6, which suspension is embodied by means of flanges 6.2, 6.3 of the battery pack 6, for example.

In addition, the battery carrier 1 has a heat exchanger 7, which is thermally connected to the battery pack 6 and is therefore able to control the temperature, i.e. cool or heat, this battery pack 6 in accordance with the respective requirements. For this purpose, a liquid 7.1 flows through the heat exchanger 7—specifically, this liquid 7.1 flows through flow channels 7.2 in the heat exchanger 7.

According to the invention, the design of the battery carrier 1 is significantly improved compared to other battery carriers 1 known from the prior art in that the lid 3 forms the heat exchanger 7—as shown in FIG. 1.

In addition—for the sake of simpler assembly and maintenance—the lid 3 that is detachably connected to the trough 2 can also be removed by means of the first screw connection 4.1 in a simple way and thus opens up an access to the battery packs 6.

Since the battery packs 6 are arranged at a distance A from the trough bottom 2.2, they are also easily accessible on their upper battery pack side 6.1. Among other things, this facilitates assembly, inspection, and maintenance work on the battery packs 6, for example also the replacement of them when they are defective.

In addition, the distance A from the battery pack underside 6.4, which is oriented toward the trough bottom 2.2, ensures that the battery packs 6 are protected significantly better from mechanical deformations of the trough 2.

To this end, it is possible for the battery packs 6 to be provided with a distance A in the trough 2 in a suspended fashion, particularly in a freely suspended fashion.

It is also conceivable, however, for at least one battery pack 6 to rest on a support 12 that is fastened to the support profile 5.1, 5.2, for example resting with its battery pack underside 6.4 on the support 12, which is shown with dashed lines in FIG. 1. The support 12 can, for example, facilitate the suspension 15 of the battery pack 6.

The battery carrier 1 according to the invention is also embodied as particularly rigid mechanically—which is why the trough 2, i.e. the trough bottom 2.2 and trough side walls 2.1, is embodied of one piece as shown in FIG. 1—or which is why the trough bottom 2.2 and trough side walls 2.1 are permanently connected to each other or are of one piece with each other.

A preferably shaped—specifically deep-drawn—sheet metal, namely sheet steel or sheet aluminum, is particularly suitable for this purpose. The mechanical bond with the support profiles 5.1, 5.2, 5.3, 5.4 affixed to the trough 2 produces, for example, a high torsional rigidity and dent resistance of the battery carrier 1, as a result of which the battery packs 6 are supported in a protected way—even when powerful mechanical loads occur.

In a simply designed and heavy-duty way, the bond between the trough 2 and support profiles 5.1, 5.2, 5.3, 5.4 is produced, for example, by means of integrally bonded connections. In this way, the support profiles 5.1, 5.2, 5.3, 5.4 are each permanently connected to both the trough side wall 2.1 and the trough bottom 2.2, namely by means of welding seams 8—as shown in FIG. 1. In addition, support profiles 5.1 and 5.2 are firmly connected to one another, which produces a frame structure 14 with a high strength and rigidity.

This firm connection is also easy to produce because the support profiles 5.1, 5.2, 5.3, 5.4 are formed from a shaped sheet metal, namely sheet steel.

Figure 2:
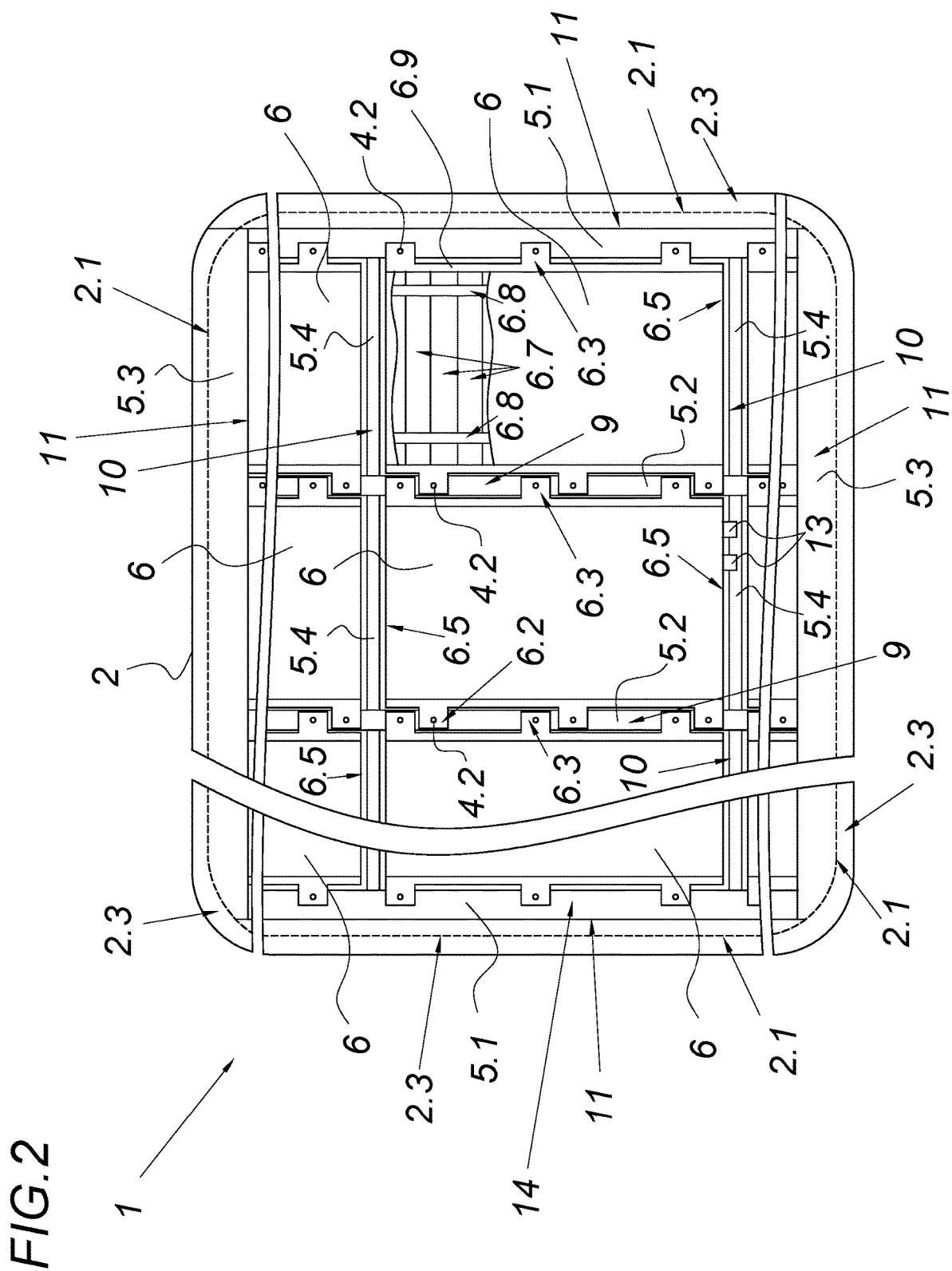
FIG. 2 shows a top view of the battery carrier with the lid removed.

As can be inferred from FIG. 2, the first support profiles 5.2 are provided in the form of cross-members 9 in the trough 2. This results in a frame structure 14 with a high mechanical load capacity, which protects the battery packs 6 from damage. The support profiles 5.2, which are spaced apart from the transverse side walls 2.1 in the battery carrier 1, are embodied as hat-shaped in cross-section and are firmly connected with their flanges to the trough bottom 2.2 and to the support profiles 5.3—which simplifies the design of the battery carrier 1 and also ensures a high mechanical load capacity. It is conceivable, although this is not shown, for support profiles 5.2 to be embodied as closed hollow profiles in cross-section.

As is clear from FIGS. 1 and 2, second support profiles 5.4 are provided as longitudinal members 10 in the trough 2. The longitudinal members 10 are firmly affixed, in particular permanently, to the first support profiles 5.2—for example welded to them. In addition, these longitudinal members 10 are lower than the cross-members 9 and are thus arranged below the upper edges 9.1 of the cross-members 9 in the trough 2. As a result, the battery packs 6 can be interconnected in a simple way by means of electrical connections, which are not shown. In addition, this also provides an ability to access at least one pole 13, in particular both poles 13, of the battery pack 6, which pole 13 or poles 13 are provided on one or both small ends 6.5 of the battery pack 6—as can be inferred from FIG. 1 based on one battery pack 6 serving as an example for all of the battery packs 6.

In the trough 2, third support profiles 5.1, 5.3 are also provided as lateral members 11 in the trough 2. These lateral members 11 adjoin the trough side wall 2.1 and are permanently connected or welded to it.

The cross-members 9 and the longitudinal members 10 are each permanently connected to opposing lateral members 11. The cross-members 9 extend continuously from one lateral member 11 to the other lateral member 11 and are affixed to these lateral members 11, preferably being permanently connected to them.

Consequently, cross-members 9, longitudinal members 10, and lateral members 11 form a frame structure 14 in the trough 2. Among other things, this can provide a high torsional rigidity for protecting the battery modules 6. The longitudinal members 10 are respectively positioned between the two cross-members 9 or between cross-members 9 and lateral members 11, as can be inferred from FIG. 2.

The detachable connection of the battery pack 6 to the support profiles 5.1, 5.2, 5.3 is produced by means of flanges 6.2, 6.3 protruding laterally from the battery pack 6, which flanges rest on the respective support profiles 5.1, 5.2 and are secured to the support profiles 5.1, 5.2 by second screw connections 4.2. As shown in FIG. 1, these flanges 6.2, 6.3 are used to affix the battery pack 6 in the trough 2 in suspended fashion. In addition, the flanges 6.2, 6.3 protrude laterally from the housing 6.9 of the battery pack 6. Furthermore, the flanges 6.2, 6.3 or the suspension 15 is/are provided in the end region of the battery pack 6 opposite from the suspended end region of the battery pack 6.

In general, it should be noted that alternatively to the first and second screw connection 4.1, 4.2, it is also conceivable for other detachable connections to be provided.

With regard to the stability of the device according to the invention, it has also turned out the be advantageous if in the vicinity of the transition of the flanges 6.2, 6.3 into the trough side wall 2.1, an external frame is provided on the outside of the trough 2—this is not shown, however.

The battery packs 6 are each affixed to two cross-members 9 or affixed to one cross-member 9 and one lateral member 11. The battery packs 6 are parts of a battery.

The thermal resistance between the lid 3 or heat exchanger 7 and the battery packs 6 is minimized in that the lid 3 braces the suspended battery pack 6 or suspended battery packs 6 in the battery carrier 1. For this purpose, the lid 3 rests with a prestressing force against the battery pack 6 by means of a thermal contact element that is provided between the lid 3 and battery pack 6. The contact element—not shown in FIG. 1—can be a thermally conductive paste, for example.

The prestressing force is exerted on the lid 3 by means of the first detachable screw connection 4.1. For this purpose, this detachable screw connection 4.1 clamps the lid 3 to a circumferential trough flange 2.3 of the trough 2, which adjoins the trough side wall 2.1 and forms the edge of the trough 2.

The heat exchanger 7 is formed by two sheets 3.1, 3.2, which rest against each other and are connected to each other. For this purpose, the two sheets 3.1, 3.2 have beads 3.3, as a result of which, the flow channels 7.2 of the heat exchanger 7 are formed between the sheets 3.1, 3.2. In addition, these beads reinforce the mechanical rigidity of the lid 3, which in turn increases the stability of the battery carrier 1. The inner sheet 3.1 oriented toward the trough rests with its beads 3.3 against at least one battery pack 6, in particular against a plurality of the battery packs 6.

As can also be inferred from FIG. 1, the battery carrier 1 is mounted as part of a traction battery in a motor vehicle 100 as implied in the drawing, namely underneath the body floor pan 101, with the lid 3 of the battery carrier 1 arranged oriented toward the body floor pan 101.

The invention claimed is:

1. A battery carrier, comprising:
   a trough formed from shaped sheet metal, which has at least one trough side wall and a trough bottom connected to the at least one trough sidewall, wherein the trough bottom is permanently connected to the at least one trough sidewall or the trough bottom is formed of one piece with the at least one trough sidewall;
   a plurality of support profiles provided in the trough and affixed to the trough,
   at least one battery pack or module, which is detachably affixed to at least two of the plurality of support profiles extending adjacent to the battery pack or module, wherein the battery pack or module is arranged at a distance from the trough bottom; and
   a lid, which is designed to be able to close the trough and is detachably connected to said trough, and the lid comprises at least two sheets that are connected to each other and form at least one flow channel for a liquid, thereby forming a heat exchanger, which is thermally connected to the battery pack or module.

2. The battery carrier according to claim 1, wherein the trough is formed from deep-drawn sheet steel.

3. The battery carrier according to claim 1, wherein the battery pack or module in the trough is arranged in suspended fashion at a distance from the trough bottom.

4. The battery carrier according to claim 1, wherein the plurality of support profiles are formed from shaped sheet metal.

5. The battery carrier according to claim 1, wherein the plurality of support profiles are connected to a self-supporting frame structure, which frame structure is affixed to the trough.

6. The battery carrier according to claim 5, wherein the self-supporting frame structure is permanently connected to the at least one trough sidewall and/or to the trough bottom.

7. The battery carrier according to claim 1, wherein first support profiles of the plurality of support profiles are provided as cross-members in the trough and are permanently connected to the trough bottom.

8. The battery carrier according to claim 7, wherein second support profiles of the plurality of support profiles are provided as longitudinal members in the trough, which longitudinal members are arranged below upper edges of the cross-members in the trough.

9. The battery carrier according to claim 8, wherein third support profiles of the plurality of support profiles are provided as lateral members in the trough and adjoining the at least one trough sidewall, which are permanently connected to the at least one trough sidewall and/or to the trough bottom.

10. The battery carrier according to claim 9, wherein the cross-members extend continuously from one lateral member to an opposing lateral member.

11. The battery carrier according to claim 5, wherein the self-supporting frame structure is formed of cross-members, longitudinal members, and lateral members.

12. The battery carrier according to claim 1, wherein in cross-section, at least two of the support profiles are top-hat-shaped or in a form of closed, hollow profiles.

13. The battery carrier according to claim 1, wherein the battery pack or module has laterally protruding flanges, which rest on the support profiles and by means of which the battery pack or module is affixed to the plurality of support profiles.

14. The battery carrier according to claim 3, wherein the lid braces the suspended battery pack or module in the battery carrier.

15. The battery carrier according to claim 14, wherein the lid rests with a prestressing force against the battery pack or module.

16. The battery carrier according to claim 1, wherein the trough has a circumferential trough flange, which adjoins the at least one trough sidewall, and the lid is detachably connectable to the trough flange.

17. The battery carrier according to claim 1, wherein the battery carrier has a plurality of battery packs or modules, which are each detachably affixed by means of a suspension to at least two of the support profiles extending adjacent to a respective battery pack or module.

18. A vehicle having a body floor pan and the battery carrier according to claim 1, wherein the battery carrier is arranged underneath the body floor pan with its lid oriented toward the body floor pan.

19. A traction battery for a vehicle having the battery carrier according to claim 1.

* * * * *